Dec. 11, 1951     A. C. McKNIGHT, JR     2,578,077
MECHANIC'S TOOL
Filed July 11, 1947
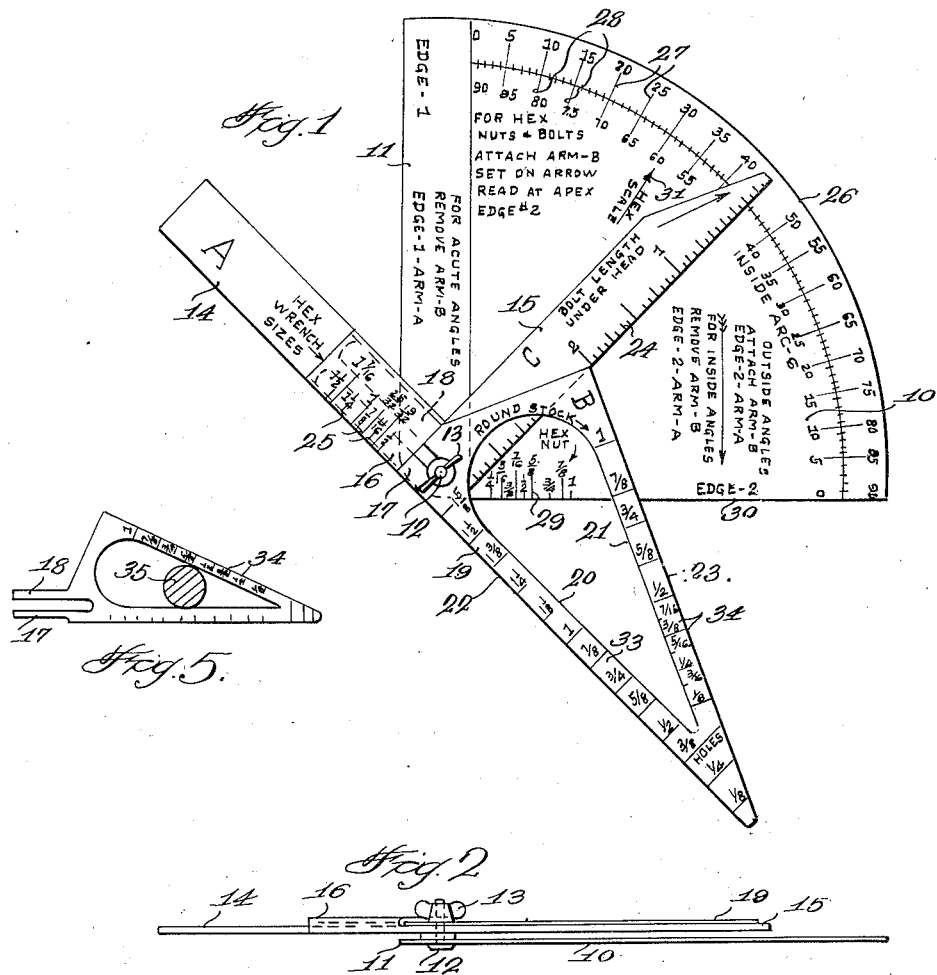
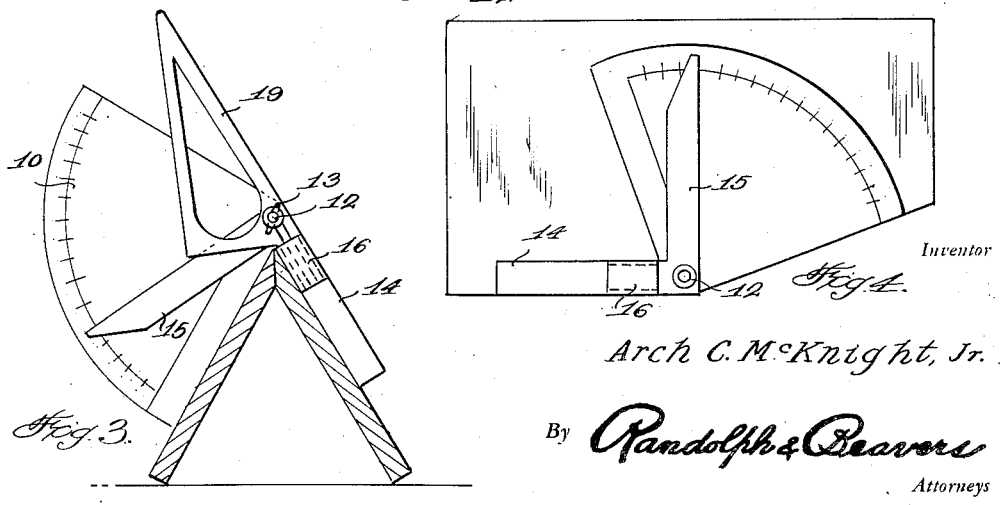
Inventor
Arch C. McKnight, Jr.
By Randolph & Beavers
Attorneys Patented Dec. 11, 1951

2,578,077

UNITED STATES PATENT OFFICE 2,578,077

MECHANIC'S TOOL

Arch C. McKnight, Jr., Torrance, Calif.

Application July 11, 1947, Serial No. 760,439

1 Claim. (Cl. 33—93)

The present invention relates to a mechanic's tool and it consists in the combinations, constructions and arrangements of parts herein described and claimed.

It is an object of the invention to provide a multi-purpose tool having a minimum of parts.

It is a further object of the invention to provide a tool capable of use as a gauge for a variety of purposes.

Another object of the invention is the provision of a tool of the character set forth which may be economically manufactured and which will be simple and effective in its operation.

Other and further objects of the invention will become apparent from a reading of the following specification taken in conjunction with the drawing, in which:

Figure 1 is a plan view of an embodiment of the invention,

Figure 2 is an end view thereof,

Figure 3 is a reduced plan view disclosing one method of using the device,

Figure 4 is a like view to Figure 3 wherein another use of the device is disclosed, and Figure 5 is a plan view of an element of the invention shown in use as a gauge of the diameter of an article.

Generally, the invention comprises a quadrant having an extended portion at one edge thereof and having a square pivotally mounted at its apex to the quadrant and having a detachably mounted substantially triangular member which may be mounted upon a common pivot point. The device is capable of a variety of uses as a gauge and measuring device.

Referring more particularly to the drawings, there is shown therein a mechanic's tool comprising a full quadrant 10 having an extended edge 11 upon one of the straight sides thereof. A bolt 12 is adapted to extend through the side 11 and is provided with a wing nut 13 or the like. Pivotally mounted upon the bolt 12 is a square having arms 14 and 15. The arm 14 is provided with a socket 16 adjacent the inner end thereof for the reception of legs 17 and 18 integrally formed upon a hollow triangle 19 which is removably mounted upon the bolt 12.

The triangle 19 is provided with a hollow interior having a pair of straight inner edges 20 and 21. It is also provided with a pair of straight outer edges 22 and 23. The arm 15 is provided with indicia 24 along one edge thereof and the socket 16 is provided with indicia 25.

The arc 26 of the quadrant 10 is provided with right reading indicia 27 and left reading indicia 28 adjacent its edge. Indicia 29 is provided along the unextended flat edge of the quadrant adjacent the bolt 12.

The device is capable of a variety of uses. For example, if it is desired to measure an acute angle the arm 14 or "A" is placed along one side of the angle in question and the edge 11 alongside the other arm of the angle whereupon the arm 15 or "C" will indicate the exact measurement of the angle where it intercepts the indicia 28.

For the measuring of an obtuse angle, the arm "A" and the edge 30 or "edge 2" are placed against the angle to be measured. For a reading 90° is added to the indicia 27 as indicated by the edge 22 of the triangle 19.

To measure the size of a hexagonal or "Hex" nut, the edge 2 of the triangle 19 is set to register with the arrow 31 whereupon the head of the nut may be placed against the arm A and the edge 2 and a reading may be had from the indicia 29.

To measure the interior diameter of a circular opening the triangle 19 is inserted therein with the edge 22 parallel and in contact with one side thereof and the indicia 33 will give a reading as to the correct diameter thereof.

To measure the diameter of a cylindrical article as, for example, a bolt, the bolt 35 may be inserted within the opening in the triangle 19 whereupon the indicia 34 may be read at the point of contact for the exact measurement of the diameter of the bolt.

Again, to measure the length of the shank of a bolt, that is to say, excluding the head thereof, the arm 15 may be inserted beneath the head of the bolt and a correct reading may be had from the indicia 24 on the arm 15. It will be apparent that, by removing the triangle 19 from the bolt 12 that the quadrant and the arms A and C may be used in many ways for the measurement of angles and that with the triangle 19 inserted into the socket 16 that the device may be utilized for a great many additional purposes.

While but one form of the invention has been shown and described herein, it will be readily apparent to those skilled in the art that many minor modifications may be made without departing from the spirit of the invention or the scope of the appended claim.

What is claimed is:

A geometrical instrument comprising a quadrant shaped base having graduations thereon, an integrally formed extended portion for one of the radial sides of said base, a pin extending through said extended portion, a square pivotally mounted upon said pin, said pin being at the center of the arcuate side of said base, a portion of said square being cooperative with the graduations on said base, a socket affixed to one leg of said square adjacent said pin, and an open frame-like triangle, a yoke member formed integrally with and extending from said triangle and adapted to encompass said pin and be received in said socket.

ARCH C. McKNIGHT, JR.

REFERENCES CITED

The following references are of record in the file of this patent:

UNITED STATES PATENTS

| Number | Name | Date |
|---|---|---|
| 223,727 | Halley | Jan. 20, 1880 |
| 409,414 | Meek | Aug. 20, 1899 |
| 639,125 | Winnett | Dec. 12, 1899 |
| 981,867 | McCormick | Jan. 17, 1911 |
| 1,096,511 | Lightle | May 12, 1914 |
| 1,247,866 | Olmsted | Nov. 27, 1917 |
| 2,048,846 | Davis | July 28, 1936 |

FOREIGN PATENTS

| Number | Country | Date |
|---|---|---|
| 223,727 | Great Britain | Jan. 20, 1880 |
| 440,845 | France | May 11, 1912 |